United States Patent
Wang et al.

(10) Patent No.: US 7,791,408 B2
(45) Date of Patent: Sep. 7, 2010

(54) METHOD AND APPARATUS FOR AUTOMATIC FREQUENCY CORRECTION

(75) Inventors: Weifeng Wang, Shanghai (CN); Caogang Yu, Shanghai (CN)

(73) Assignee: Beken Corporation, Shanghai (CN)

( * ) Notice: Subject to any disclaimer, the term of this patent is extended or adjusted under 35 U.S.C. 154(b) by 133 days.

(21) Appl. No.: 12/256,406

(22) Filed: Oct. 22, 2008

(65) Prior Publication Data

US 2010/0041357 A1  Feb. 18, 2010

(30) Foreign Application Priority Data

Aug. 12, 2008  (CN)  .................. 2008 1 0043699

(51) Int. Cl.
*H03D 3/00* (2006.01)
*H03D 3/02* (2006.01)
*H03D 3/24* (2006.01)
*H04L 27/14* (2006.01)
*H04L 27/152* (2006.01)

(52) U.S. Cl. .................. 329/325; 329/323; 375/327; 375/344

(58) Field of Classification Search ......... 329/323–326; 331/17, DIG. 2; 375/324–328, 344, 376; 455/214, 260
See application file for complete search history.

(56) References Cited

U.S. PATENT DOCUMENTS 5,396,521 A * 3/1995 Minami ...................... 375/344

* cited by examiner

*Primary Examiner*—David Mis
(74) *Attorney, Agent, or Firm*—Perkins Coie LLP

(57) ABSTRACT

A method and apparatus for automatic frequency correction in a demodulation circuit. The apparatus includes a demodulator, a frequency offset estimator, a frequency controller, and an oscillator. The oscillator provides a receiver clock signal which the demodulator employs to demodulate a modulated signal. The frequency offset estimator estimates an offset between a carrier wave frequency of the modulated signal and a frequency of the receiver clock signal. The frequency controller provides a frequency control signal to the oscillator for adjusting the frequency of the receiver clock. While the estimated offset is outside of an adjustment range, the frequency controller maintains the frequency control signal at its previous value. The frequency controller also adjusts the adjustment range based on past error signal values.

20 Claims, 5 Drawing Sheets

METHOD AND APPARATUS FOR AUTOMATIC FREQUENCY CORRECTION

CROSS-REFERENCE TO RELATED APPLICATION

This application claims priority to Chinese Patent Application No. 200810043699.4 filed Aug. 12, 2008, the disclosure of which is hereby incorporated by reference in its entirety.

TECHNICAL FIELD

The present disclosure is related to methods and apparatus for automatic frequency correction in demodulation circuits.

BACKGROUND

Demodulation circuits are often employed in communication systems. For example, demodulation circuits and methods may be employed to demodulate (e.g., separate) the carrier wave and data components of a modulated signal. Demodulation circuits may be employed in receivers and transceivers (e.g., wired telephones, cable boxes, cable modems, cordless telephones, mobile telephones, amateur radio transceivers, televisions, optical transceivers, etc), and in other devices.

Typically, demodulation circuits employ a receiver clock signal to perform the demodulation. The receiver clock signal may be derived from the modulated signal, may be independently generated by the demodulation circuit, may be generated by other circuits, and/or the like. Generally, an ideal frequency of the receiver clock signal is the carrier wave frequency of the modulated signal. Offset between the ideal frequency and the actual frequency of the receiver clock signal may adversely affect demodulation of the modulated signal. For example, frequency mismatch may result in data component distortion, increase the bit error rate (BER), increase intersymbol interference, decrease the link margin, and/or the like. In certain applications, it may be beneficial to reduce these and other detrimental effects of such offset.

DETAILED DESCRIPTION

The following disclosure describes several embodiments of the invention. Several details describing well-known structures or processes are not set forth in the following description for purposes of brevity and clarity. Also, several other embodiments of the invention can have different configurations, components, or procedures than those described in this section. A person of ordinary skill in the art, therefore, will accordingly understand that the invention may have other embodiments with additional elements, or the invention may have other embodiments without several of the elements shown and described below with reference to the figures.

Figure 1:
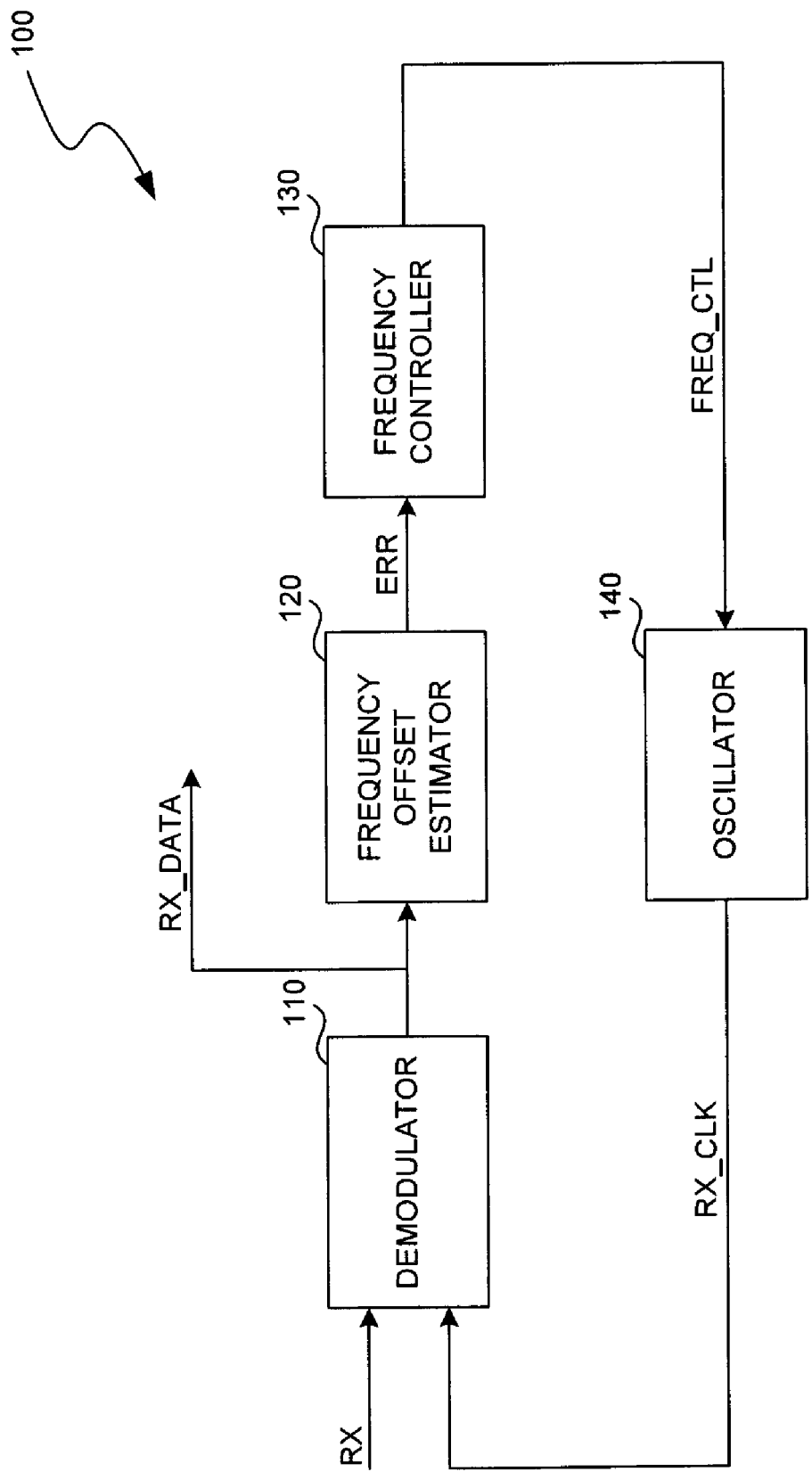
FIG. 1 is a block diagram of a demodulation circuit in accordance with an embodiment of the invention.

FIG. 1 is a block diagram of demodulation circuit 100. As illustrated, circuit 100 includes demodulator 110, frequency offset estimator 120, frequency controller 130, and oscillator 140. In one embodiment, circuit 100 is a phase lock loop (PLL) based demodulation circuit that is configured to provide received data signal RX_DATA from modulated signal RX. An application specific integrated circuit (ASIC), a field programmable gate array (FPGA), discrete components, and/or the like, may be employed in circuit 100. Circuit 100 may also include analog circuitry, digital circuitry, and/or a mix of analog and digital circuitry. However, circuit 100 also illustrates a logical flow diagram for by employing a digital signal processor (DSP), a microprocessor, a microcontroller, an ASIC, other digital logic, and/or the like, to demodulate modulated signal RX.

Circuit 100 may be employed by cellular phones, wireless phones, wireless network cards, wireless radios, and/or other suitable wireless communication devices to demodulate a modulated signal that has been transmitted through a communications channel. Circuit 100 may also be employed in, or by, a wide variety of devices and systems for performing demodulation. For example, wireless communications devices, wired communications devices, interface systems, computing devices, optical media devices, embedded systems, and/or other electronic devices or circuits may employ circuit 100. In one embodiment, circuit 100 is employed by a software radio to demodulate modulated signal RX. Modulated signal RX may include a data component having data encoded therein and include a carrier wave component which may be based, at least in part, on a transmitter clock signal of a remote transmitter.

In one embodiment, modulated signal RX is provided to demodulator 110 from an analog to digital converter (ADC), an radio frequency (RF) receiver, and/or the like (not shown). These and other devices may be configured to provide modulated signal RX from a wired or wireless communications signal. However, modulated signal RX may be provided from any suitable source.

In one embodiment, demodulator 110 is configured to receive modulated signal RX, to receive receiver clock signal RX_CLK, and to provide received data signal RX_DATA. Demodulator 110 may be configured to demodulate modulated signal RX and to provide the data encoded on modulated signal RX (e.g., the data component) as received data signal RX_DATA based, at least in part, on receiver clock signal RX_CLK and modulated signal RX. Demodulator 110 may be configured as a frequency modulation (FM) demodulator, phase shift keying (PSK) demodulator, frequency shift keying (FSK) demodulator, quadrature amplitude modulation demodulator, and/or the like. Received data signal RX_DATA may be a recovered bit stream from a physical layer interface and may be provided for downstream processing to a vocoder, to a decryption device, to an error correction device, and/or to the like.

In embodiments where receiver clock signal RX_CLK is employed to demodulate modulated signal RX, deviation of receiver clock signal RX_CLK frequency from an ideal frequency may adversely affect demodulation. In typical environments, an ideal frequency for receiver clock signal RX_CLK is the carrier wave frequency of modulated signal RX. However, in other environments, an ideal frequency for receiver clock signal RX_CLK may be wholly unrelated to, a multiple of, or a fraction of the carrier wave frequency of receiver clock signal RX_CLK.

In one embodiment, frequency offset estimator 120 is configured to receive received data signal RX_DATA and to provide error signal ERR to frequency controller 130. In one embodiment, frequency offset estimator 120 provides error signal ERR based, at least in part, on an estimated offset between the carrier wave frequency of modulated signal RX and the frequency of receiver clock signal RX_CLK. Frequency offset estimator 120 may include a phase frequency detector (PFD), PFD circuitry, a PLL, PLL circuitry, frequency measurement circuitry, and/or the like. In addition, in other embodiments, frequency offset estimator 120 may be integrated into demodulator 110, frequency controller 130, and/or the like.

Frequency controller 130 is configured to receive error signal ERR and to provide frequency control signal FREQ_CTL to oscillator 140. In one embodiment, frequency controller 130 is further configured to filter noise, other interference, and/or the like, from error signal ERR to drive the frequency of receiver clock signal RX_CLK towards an ideal frequency. Likewise, frequency controller 130 may be configured to smooth (e.g., limit the rate of change) frequency control signal FREQ_CTL, for example, to smooth out frequency changes on receiver clock signal RX_CLK and to decrease glitches, decrease demodulation error, and/or the like, on received data signal RX_DATA.

Oscillator 140 is configured to receive frequency control signal FREQ_CTL and to provide receiver clock signal RX_CLK. Oscillator 140 may provide receiver clock signal RX_CLK, directly or indirectly, to demodulator 110. If receiver clock signal RX_CLK is provided to demodulator 110 indirectly, a divider, a multiplier, and/or the like, may be employed to drive the frequency of receiver clock signal RX_CLK is to a multiple or to a fraction of the carrier wave frequency of modulated signal RX. In addition, receiver clock signal RX_CLK may be provided along with received data signal RX_DATA to other circuitry (not shown).

In one embodiment, oscillator 140 sets the frequency of receiver clock signal RX_CLK based on a value of frequency control signal FREQ_CTL. For example, oscillator 140 may be configured such that the frequency of receiver clock signal RX_CLK is proportional to the value of frequency control signal FREQ_CTL. Oscillator 140 may include a digital clock synthesizer, a voltage controlled oscillator, a current controlled oscillator, a crystal oscillator, a ring oscillator, a surface acoustic wave oscillator, a Colpitts oscillator, and/or the like.

Figure 2:
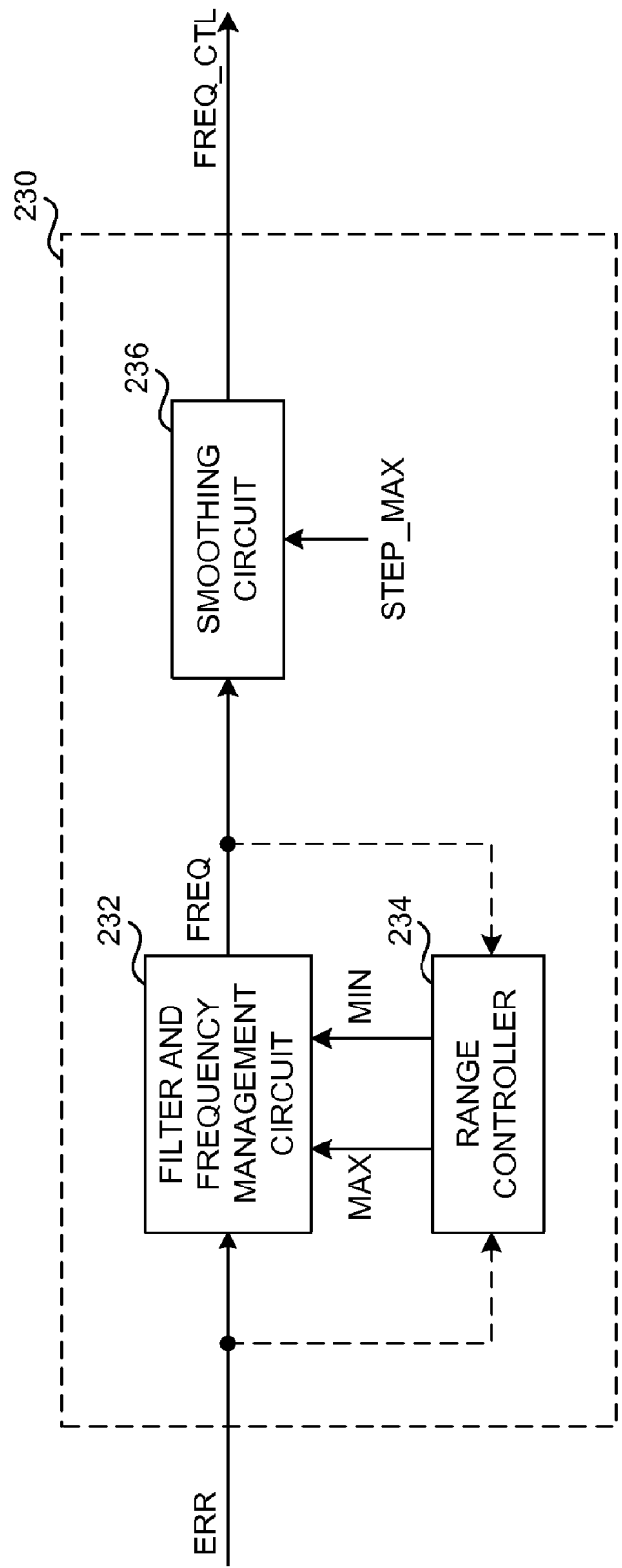
FIG. 2 is a block diagram of the frequency controller of FIG. 1 in accordance with an embodiment of the invention.

FIG. 2 is a block diagram of frequency controller 230. As illustrated, frequency controller 230 includes filter and frequency management circuit 232, range controller 234, and smoothing circuit 236. Frequency controller 230 may be employed as an embodiment of frequency controller 130 of FIG. 1. As discussed above, frequency controller 230 is configured to provide frequency control signal FREQ_CTL based, at least in part, on error signal ERR.

Filter and frequency management circuit 232 is configured to receive error signal ERR and to provide frequency representation signal FREQ. In one embodiment, filter and frequency management circuit 232 is further configured to receive range control signals MAX and MIN to define an adjustment range. For example, filter and frequency management circuit 232 may be configured to synchronously sample error signal ERR and act upon (e.g., adjust frequency representation signal FREQ) for sampled values that are within the adjustment range defined by range control signals MAX and MIN.

Range controller 234 is configured to provide range control signals MAX and MIN to filter and frequency management circuit 232 to define the adjustment range. For example, range control signals MAX and MIN may be employed by filter and frequency management circuit 232 to determine if a particular sample of error signal ERR is a valid sample to be acted on or is an outlier to should be ignored.

Range controller 234 is further configured to update range control signals MIN and MAX periodically based, at least in part, on sampling either error signal ERR or frequency representation signal FREQ. For example, range controller 234 may be configured to update range control signals MIN and MAX every N samples of error signal ERR. In one embodiment, N is 16. However, N may also be 4 and/or any other suitable number. Range controller 234 may be configured to update range control signals MAX and MIN independently or in conjunction with each other.

In one embodiment, range controller 234 is configured to define range control signals MAX and MIN such that one out of N samples is expected to be outside of the defined adjustment range. However, other methods may be employed. For example, range controller 234 may calculate a variance or standard deviation of all samples, or of samples within the previous adjustment range. In yet another embodiment, range controller 234 may be configured to calculate a center frequency and to provide range control signals MAX and MIN to define an adjustment range about the center frequency. In one embodiment, such a range may be ±2 parts per million (ppm) to ±8 ppm.

Smoothing circuit 236 is configured to receive frequency representation signal FREQ and configuration signal STEP_MAX, and to provide frequency control signal FREQ_CTL. In one embodiment, smoothing circuit 236 is further configured to change frequency control signal FREQ_CTL, in a single step, if frequency representation signal FREQ changes by an amount that is less than a maximum step size defined by configuration signal STEP_MAX. If the change on frequency representation signal FREQ is larger than the maximum step size, then smoothing circuit may change frequency control signal FREQ_CTL in multiple steps, each separated by a delay time. The delay time and the maximum step size may be selected to balance the effects of loop delay against the effects of rapid changes to the frequency of receiver clock signal RX_CLK.

Figure 3:
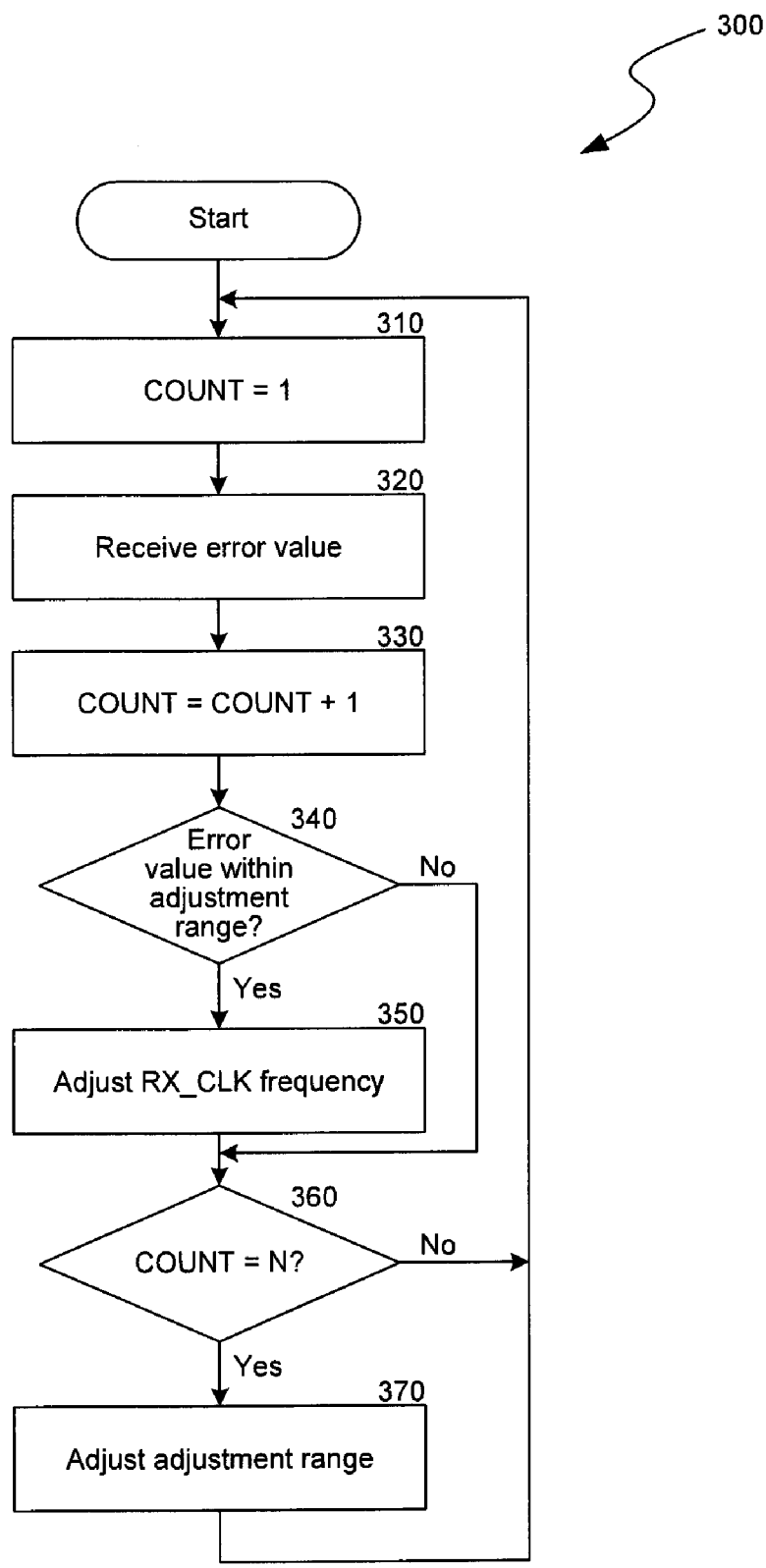
FIG. 3 is a logical flow diagram of a process for adjusting a frequency of a receiver clock signal in accordance with an embodiment of the invention.

FIG. 3 is a logical flow diagram of process 300 for adjusting a frequency of a receiver clock signal. Process 300 may be performed by circuit 100 of FIG. 1 or by frequency controller 230 of FIG. 2. In addition, process 300 may also be performed by other processors, circuits, or systems, whether or not such processors, circuits, or systems are described herein.

Flowing from a start block, processing begins at step 310 where variable COUNT is initialized to 1. Processing then flows to step 320. At step 320, an error value is received, for example, by frequency controller 130. Processing then flows to step 330, where variable COUNT is incremented by 1. Processing then flows to decision block for 340 where the error value is compared to an adjustment range. For example, frequency controller 130 may be employed to determine if the received error value is within the adjustment range. As discussed above, the adjustment range may be defined by signals MAX and MIN from range controller 234 of FIG. 2. However, other variables, signals, and/or the like may also be suitably employed to define the adjustment range. If the error value is within the adjustment range, processing flows to step 350 and the frequency of receiver clock signal RX_CLK is adjusted. For example, the frequency of receiver clock signal RX_CLK may be adjusted in either a single step or in multiple steps, as discussed above. Processing then flows to decision block 360. However, if at decision block 340, the error value is not within the adjustment range, processing bypasses step 350 and flows directly to decision block 360.

At decision block 360 variable COUNT is compared to constant N. Constant N may be selected to define how often the adjustment range is adjusted at step 370. In one embodiment, constant N is 16. However, any other suitable values may be employed. If variable COUNT equals constant N, processing flows to step 370 where the adjustment range is adjusted, as discussed above. Otherwise processing returns to block 310.

Figure 4:
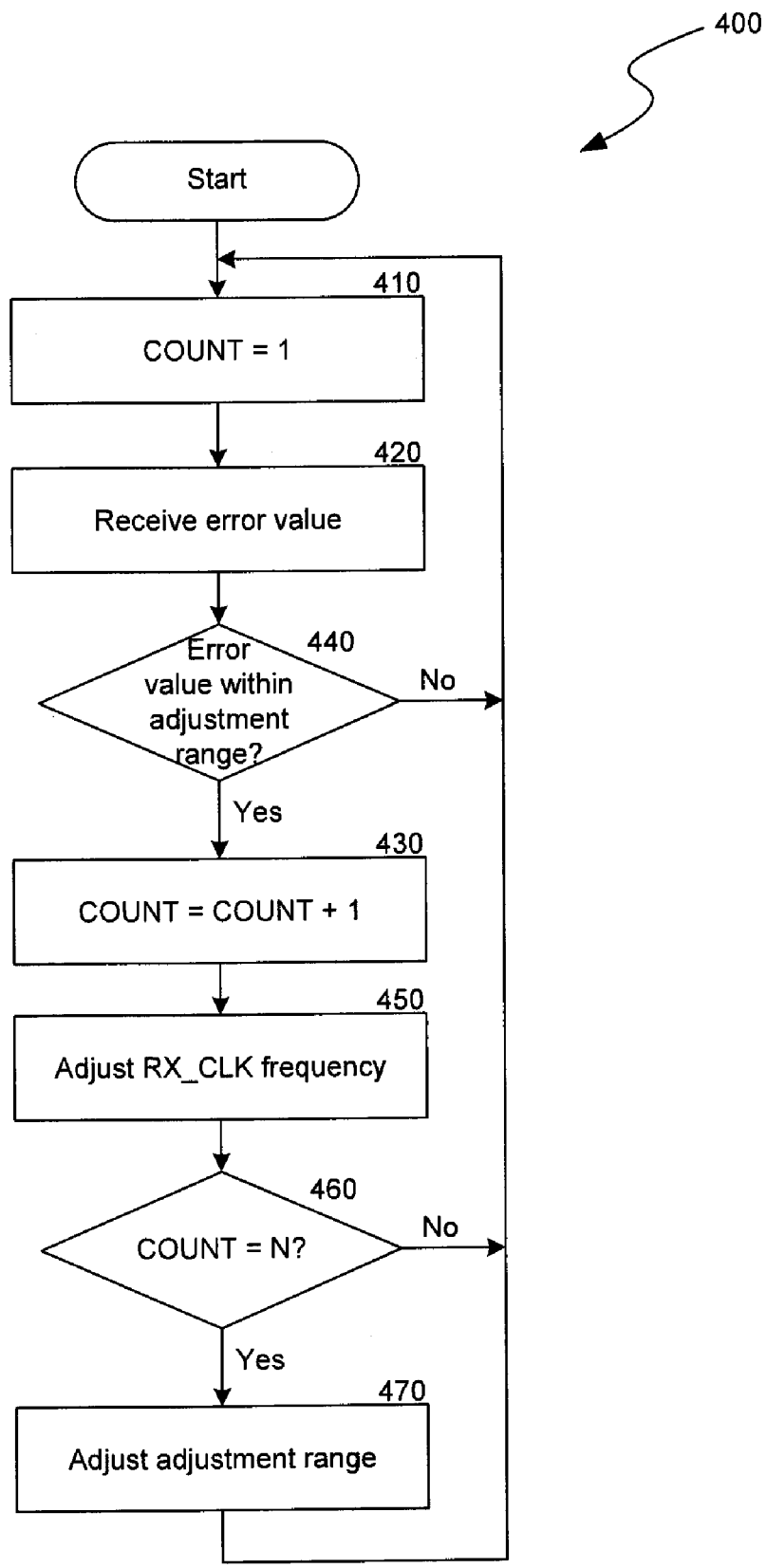
FIG. 4 is a logical flow diagram of a process for adjusting a frequency of a receiver clock signal in accordance with another embodiment of the invention.

FIG. 4 is a logical flow diagram of process 400 for adjusting a frequency of a receiver clock signal. Process 400 may be performed by circuit 100 of FIG. 1 or by frequency controller 230 of FIG. 2. In addition, process 400 may also be performed by other processors, circuits, or systems, whether or not such processors, circuits, or systems are described herein.

Process 400 is similar in ways to process 300 of FIG. 3. However, it is different from process 300 in other ways. For example, process 400 increments variable COUNT after the received error value is determined as being within the adjustment range. Accordingly, the adjustment range is adjusted, at step 470, after N error values within the prior adjustment range are received. In contrast, process 400 adjusts the adjustment range after N error values are received, irrespective of whether these received error values are within the prior adjustment range.

Figure 5:
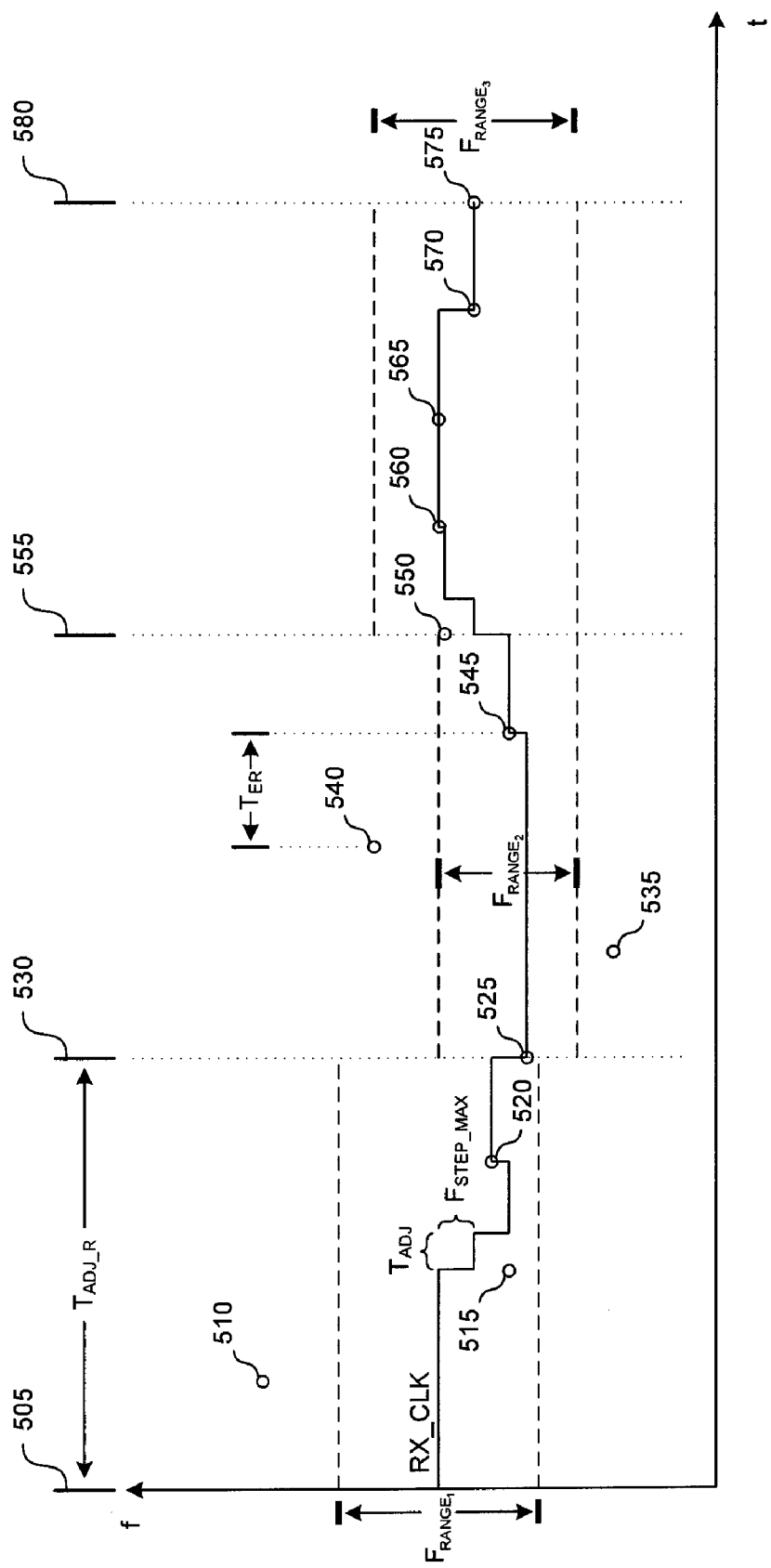
FIG. 5 is a graph illustrating aspects of the operation of a frequency controller in accordance with an embodiment of the invention.

FIG. 5 is a graph illustrating aspects of the operation of embodiments of demodulation circuit 100 of FIG. 1 and of frequency controller 230 of FIG. 2. While FIG. 5 is described with reference to these embodiments, the invention is not so limited. Other frequency controllers, circuits, systems, and/or the like, may also be employed. Likewise, operation of other embodiments of the invention may be different than depicted by FIG. 5. FIG. 5 is not drawn to scale.

FIG. 5 illustrates the frequency of receiver clock signal RX_CLK over time. Also, FIG. 5 illustrates the operation of a synchronous frequency controller having various time domains for different functionalities. For example, duration $T_{ADJ\_R}$ represents the time between adjustments of the adjustment range, time $T_{ER}$ represents the sampling period for error signal ERR, and time $T_{ADJ}$ represents a time constant of smoothing circuit 236. In this illustration, the circles (e.g., 310, 315, 320, 325, 335, etc) represent sampled values of the carrier wave frequency of modulated signal RX. For purposes of this illustration, these sampled values represent ideal values for receiver clock signal RX_CLK.

Starting at time 305, the frequency of receiver clock signal RX_CLK begins at the middle of adjustment range $F_{RANGE1}$ which is, for example, defined by range control signals MAX and MIN. When circuit 100 receives sample 310, it does not adjust receiver clock signal RX_CLK because sample 310 is outside adjustment range $F_{RANGE1}$. Next, sample 315 is within adjustment range $F_{RANGE1}$ but is farther from the current frequency of receiver clock signal RX_CLK than maximum step size $F_{STEP\_MAX}$. Accordingly, circuit 100 adjusts receiver clock signal RX_CLK's frequency towards sample 315 by $F_{STEP\_MAX}$. After a delay of time $T_{ADJ}$, circuit 100 completes the adjustment.

Samples 320 and 325 are both within adjustment range $F_{RANGE1}$ and are closer than maximum step size $F_{STEP\_MAX}$ from the current frequency of receiver clock signal RX_CLK. Accordingly, circuit 100 adjusts the frequency of receiver clock signal RX_CLK towards these samples in a single step.

At time 330, circuit 100 has received a defined number of samples and triggers an adjustment of the adjustment range to $F_{RANGE2}$. In this embodiment, adjustment range $F_{RANGE2}$ is made smaller than adjustment range $F_{RANGE1}$ because of the limited variance between samples 315, 320, and 325, and/or because only one sample (310) was outside adjustment range $F_{RANGE1}$.

Continuing, circuit 100 does not adjust the frequency of receiver clock signal RX_CLK for either sample 335 or 340 because they are outside adjustment range $F_{RANGE2}$. Circuit 100 then adjusts the frequency of receiver clock signal RX_CLK for sample 345, in a single step, and for sample 355 in multiple steps. At time 355, circuit 100 also adjusts the adjustment range to $F_{RANGE3}$. In this embodiment, adjustment range $F_{RANGE3}$ is made larger than adjustment range $F_{RANGE2}$ because of the greater sample variance between times 330 and 355 and/or because two samples were outside of adjustment range $F_{RANGE2}$.

Circuit 100 then adjusts the frequency of receiver clock signal RX_CLK for samples 360, 365, 370, and 375.

While the above description describes certain embodiments of the invention, and describes the best mode contemplated, no matter how detailed the above appears in text, the invention can be practiced in many ways. Details of the system may vary in implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

We claim:

1. A circuit for demodulating a modulated signal, comprising:
   a demodulator configured to receive a modulated signal, to receive a receiver clock signal, and to provide a received data signal that is based, at least in part, on the modulated signal and on the receiver clock signal;
   a frequency offset estimator configured to estimate an offset between a frequency of the modulated signal and a frequency of the receiver clock signal, and to provide an error signal that is based, at least in part, on the estimated offset;
   a frequency controller configured to receive the error signal and to provide a frequency control signal such that a value of the frequency control signal is maintained while a value of the error signal is outside an adjustment range, and is further configured to adjust the adjustment range based, at least in part, on the error signal; and
   an oscillator configured to receive the frequency control signal and to provide the receiver clock signal such that the frequency of the receiver clock signal is based, at least in part, on the frequency control signal.

2. The circuit of claim 1, wherein the frequency controller is further configured to synchronously sample the value of the error signal and to control the frequency control signal based, at least in part, on each sample that is within the adjustment range.

3. The circuit of claim 1, wherein the frequency controller is further configured to limit the rate of change of the frequency control signal.

4. The circuit of claim 1, wherein the frequency controller is further configured to synchronously sample the value of the error signal and to adjust the adjustment range based, at least in part, on multiple samples of the error signal.

5. The circuit of claim 4, wherein each sample of the multiple samples is within the adjustment range.

6. The circuit of claim 1, wherein the frequency controller includes:
   a filter and frequency management circuit configured to receive the error signal and to provide a frequency representation signal such that a value of the frequency representation signal is maintained while a value of the error signal is outside the adjustment range; and
   a smoothing circuit configured to receive the frequency representation signal; to provide the frequency control signal; to change the frequency control signal, in a single step, if the frequency representation signal represents a change to the frequency control signal that is less than or equal to a maximum step size; and to change the frequency control signal, in multiple steps, if the frequency representation signal represents a change to the frequency control signal that is greater than a maximum step size.

7. The circuit of claim 1, wherein the frequency controller includes:
   a filter and frequency management circuit configured to receive the error signal and to provide a frequency representation signal such that a value of the frequency representation signal is maintained while a value of the error signal is outside the adjustment range; and
   a range controller configured to define the adjustment range.

8. The circuit of claim 1, wherein the modulated signal includes a carrier wave component and a data component, wherein the carrier wave component is based, at least in part, on a transmitter clock signal of a remote transmitter, and wherein the frequency of the modulated signal is the frequency of the carrier wave component.

9. The circuit of claim 1, wherein the demodulator, the frequency offset estimator, the frequency controller, and the oscillator are configured as a synchronous demodulator configured to demodulate a digital communications signal.

10. The circuit of claim 1, wherein the demodulator, the frequency offset estimator, and the frequency controller are digital circuits.

11. The circuit of claim 1, wherein the demodulator, the frequency offset estimator, and the frequency controller are implemented by a digital signal processor.

12. The circuit of claim 1, wherein the oscillator includes at least one of a digital clock synthesizer, a voltage controlled oscillator, a current controlled oscillator, a crystal oscillator, a ring oscillator, a surface acoustic wave oscillator, or a Colpitts oscillator.

13. The circuit of claim 1, wherein the oscillator includes a digital clock synthesizer.

14. A circuit for demodulating a modulated signal, comprising:
   means for generating a receiver clock signal;
   means for demodulating a data component from a modulated signal based, at least in part, on the receiver clock signal;
   means for estimating an offset between a frequency of the receiver clock signal and a frequency of the modulated signal;
   means for maintaining the frequency of the receiver clock signal while the offset is outside of an adjustment range; and
   means for adjusting the adjustment range based, at least in part, on the offset.

15. The circuit of claim 14, further comprising:
   means for changing the frequency of the receiver clock signal if the offset is not outside of an adjustment range.

16. The circuit of claim 14, further comprising:
   means for changing the frequency of the receiver clock signal, in a single step, if the offset is not outside of an adjustment range and the offset represents a change to the frequency of the receiver clock signal that is less than or equal to a maximum step size; and
   means for changing the frequency of the receiver clock signal, in multiple steps, if the offset is not outside of an adjustment range and the offset represents a change to the frequency of the receiver clock signal that is greater than a maximum step size.

17. A method of demodulating a modulated signal, comprising:
   receiving a first error value that represents a first offset between a frequency of a modulated signal at a first time and a frequency of a receiver clock signal at the first time;
   changing the frequency of the receiver clock signal if the first error value is within an adjustment range;
   maintaining the frequency of the receiver clock signal if the first error value is not within the adjustment range;
   receiving a second error value that represents a second offset between the frequency of the modulated signal at a second time and the frequency of the receiver clock signal at the second time; and
   adjusting the adjustment range based, at least in part, on the first error value and on the second error value.

18. The method of claim 17, wherein the modulated signal includes a carrier wave component and a data component, wherein the carrier wave component is based, at least in part, on a transmitter clock signal of a remote transmitter, and wherein the frequency of the modulated signal is the frequency of the carrier wave.

19. The circuit of claim 17, wherein receiving the first error value includes: synchronously sampling an error signal, wherein the error signal represents the offset between the frequency of the modulated signal and the frequency of the receiver clock signal.

20. The method of claim 17, wherein changing the frequency of the receiver clock signal includes: limiting a rate of change of the frequency of the receiver clock signal if a value of the error signal represents a change to the frequency of the receiver clock signal that is greater than a maximum step size.

* * * * *